US008433327B2

(12) United States Patent
Kumar et al.

(10) Patent No.: US 8,433,327 B2
(45) Date of Patent: Apr. 30, 2013

(54) METHODS OF DETERMINING COVERAGE AREAS

(75) Inventors: Gopal Kumar, Bridgewater, NJ (US); Rich Davies, Corsham (GB); Tracey Dwyer, Wayne, NJ (US); Robert Soni, Randolph, NJ (US)

(73) Assignee: Alcatel Lucent, Paris (FR)

( * ) Notice: Subject to any disclaimer, the term of this patent is extended or adjusted under 35 U.S.C. 154(b) by 416 days.

(21) Appl. No.: 12/801,049

(22) Filed: May 19, 2010

(65) Prior Publication Data

US 2011/0287770 A1    Nov. 24, 2011

(51) Int. Cl.
*H04W 40/00* (2009.01)

(52) U.S. Cl.
USPC ...... 455/446; 455/422.1; 455/423; 455/67.11

(58) Field of Classification Search .................. 455/446, 455/422.1–425, 67.11–67.7
See application file for complete search history.

(56) References Cited

U.S. PATENT DOCUMENTS

| | | | | |
|---|---|---|---|---|
| 5,179,722 | A * | 1/1993 | Gunmar et al. ............... | 455/446 |
| 5,561,841 | A * | 10/1996 | Markus ......................... | 455/446 |
| 6,631,267 | B1 * | 10/2003 | Clarkson et al. .............. | 455/446 |
| 6,847,815 | B1 | 1/2005 | Graf et al. | |
| 7,047,021 | B2 * | 5/2006 | Ohto et al. .................. | 455/456.1 |
| 7,403,779 | B2 * | 7/2008 | De Cambray-Mathan ... | 455/446 |
| 7,469,143 | B2 * | 12/2008 | Jain et al. ...................... | 455/446 |
| 7,613,464 | B2 * | 11/2009 | Unkefer et al. .............. | 455/452.2 |
| 7,640,014 | B2 * | 12/2009 | Kanada et al. .............. | 455/422.1 |
| 7,716,740 | B2 * | 5/2010 | Robert et al. .................. | 726/23 |
| 7,848,262 | B2 * | 12/2010 | El-Damhougy .............. | 370/255 |
| 8,078,116 | B2 * | 12/2011 | Houllier et al. .............. | 455/67.7 |
| 2004/0116111 | A1 * | 6/2004 | Saunders ....................... | 455/423 |
| 2006/0223523 | A1 * | 10/2006 | Houllier et al. .............. | 455/423 |
| 2007/0299946 | A1 * | 12/2007 | El-Damhougy .............. | 709/223 |
| 2007/0299947 | A1 | 12/2007 | El-Damhougy | |
| 2010/0105399 | A1 * | 4/2010 | Akerlund ...................... | 455/446 |

FOREIGN PATENT DOCUMENTS

| | | |
|---|---|---|
| DE | 197 52 200 | 2/1999 |
| DE | 10 2007 008 196 | 8/2008 |
| WO | WO 2005/009054 | 1/2005 |

OTHER PUBLICATIONS

International Search Report and Written Opinion dated Jul. 1, 2011 for PCT/US2011/032288.
Huang Chuanhe et al. "An Interference-aware and Power Efficient Topology Control Algorithm for Wireless Multi-hop Networks", Mar. 17, 2008, Pervasive Computing and Communications, 2008. Percom 2008. Sixth Annual IEEE International Conference on, IEEE, Piscataway, NJ, USA, pp. 330-335, XP031250403, ISBN: 978-0-7695-3113-7.
Katerina Dufkova et al. "Energy Savings for Cellular Network With Evaluation of Impact on Data Traffic Performance", Apr. 12, 2010, Wireless Conference (EW), 2010 European, IEEE, Piscataway, NJ, USA, pp. 916-923, XP031688486, ISBN: 978-1-4244-5999-5.

(Continued)

*Primary Examiner* — Sharad Rampuria
(74) *Attorney, Agent, or Firm* — Harness, Dickey & Pierce PLC

(57) ABSTRACT

A method of determining coverage areas in a communication system includes determining, by a controller, a plurality of base stations in the communication system and determining, by the controller, a Voronoi region for each of the plurality of base stations. The Voronoi region corresponds to the coverage area for the base station. Each location in the Voronoi region is closest to the base station than any other base station of the plurality of base stations.

12 Claims, 6 Drawing Sheets

OTHER PUBLICATIONS

Abellanas et al. "2-Covered Paths by a Set of Antennas With Minimum Power Transmission Range", Jun. 30, 2009, Information Processing Letters, Amsterdam, NL, pp. 768-773, XP026107929, ISBN: 0020-0190.

* cited by examiner

METHODS OF DETERMINING COVERAGE AREAS

BACKGROUND

A wireless network generally is divided into multiple cells with each cell having at least one base station. A user equipment (e.g., mobile phone) wishing to send information establishes communication with a base station in the cell.

Operating parameters, in addition to identification parameters, are part of network management. A variety of operating parameters such as antenna orientation (e.g., tilt angle), transmit power limits and pilot power fraction affect network function.

In third generation (3G) standards for wireless networks such as CMDA2000 and Universal Mobile Telecommunications System (UMTS), performance analysis is used to evaluate general behavior of network algorithms. For performance analysis in 3G, such as analysis of handoffs, access performance and application throughput, hexagonal network models of coverage areas are used.

FIG. 1 illustrates a conventional hexagonal network model. FIG. 1 shows a conventional hexagonal network model 100. As shown, the hexagonal network model 100 includes base stations $BS_1$-$BS_7$, with each of the base stations $BS_1$-$BS_7$ having a coverage area $C_1$-$C_7$. As shown, the coverage areas $C_1$-$C_7$ are cells for the base stations $BS_1$-$BS_7$ and are modeled as hexagons. Hexagonal network models are sufficient for 3G technologies.

Long Term Evolution (LTE) is the name given to a project to improve the Universal Mobile Telecommunications System (UMTS) standard to cope with future requirements. In one aspect, UMTS has been modified to provide for the Evolved Universal Terrestrial Radio Access Network (E-UTRAN) as a fourth generation (4G) wireless network.

An E-UTRAN includes evolved NodeBs (eNodeBs), which provide the Evolved Universal Terrestrial Radio Access (E-UTRA) user plane (PDCP/RLC/MAC/PHY) and control plane (RRC) protocol terminations with a UE. As discussed herein, eNodeB refers to a base station that provides radio access to user equipments (UEs) within a given coverage area. This coverage area is referred to as a footprint of a cell. The eNodeBs are interconnected with each other by an X2 interface. The eNodeBs are also connected to a Mobility Management Entity (MME) via an S1-MME interface (control plane), and to a Serving Gateway (SGW) via an S1-U interface (user/data plane).

In 4G, performance has become more personal and localized with Self-Organizing and Self-Optimizing Networks (SON). Therefore, performance analysis evaluation has a greater sense of accountability and needs to answer specific questions about specific cells. Consequently, general analysis of networks using hexagonal models is insufficient. Furthermore, since performance optimization is part of the network, the analysis and models should provide computational efficiency to allow these computations to be made on network elements.

SUMMARY

At least one example embodiment discloses a method of determining coverage areas in a communication system. The method includes determining, by a controller, a plurality of base stations in the communication system and determining, by the controller, a Voronoi region for each of the plurality of base stations. The Voronoi region corresponds to the coverage area for the base station.

At least another example embodiment discloses a method of analyzing performance of a communication system. The method includes determining, by a base station including at least one antenna, at least one vertex of a Voronoi region. The Voronoi region corresponds to a coverage area for the base station and the at least one vertex corresponds to a maximum transmitting distance.

BRIEF DESCRIPTION OF THE DRAWINGS

Example embodiments will be more clearly understood from the following detailed description taken in conjunction with the accompanying drawings.

FIG. 1 illustrates a conventional hexagonal network model;

FIG. 2 shows a portion of a communication system according to example embodiments;

FIG. 3 illustrates a method of determining coverage areas in a communication system according to example embodiments;

FIG. 4 illustrates a method of determining transmit power based on a Voronoi region according to example embodiments;

FIG. 5 illustrates a method of determining a tilt angle for an antenna based on a Voronoi region according to example embodiments; and FIG. 6 illustrates a communication system having a plurality of eNodeBs and Voronoi regions according to example embodiments.

DETAILED DESCRIPTION

Figure 1:
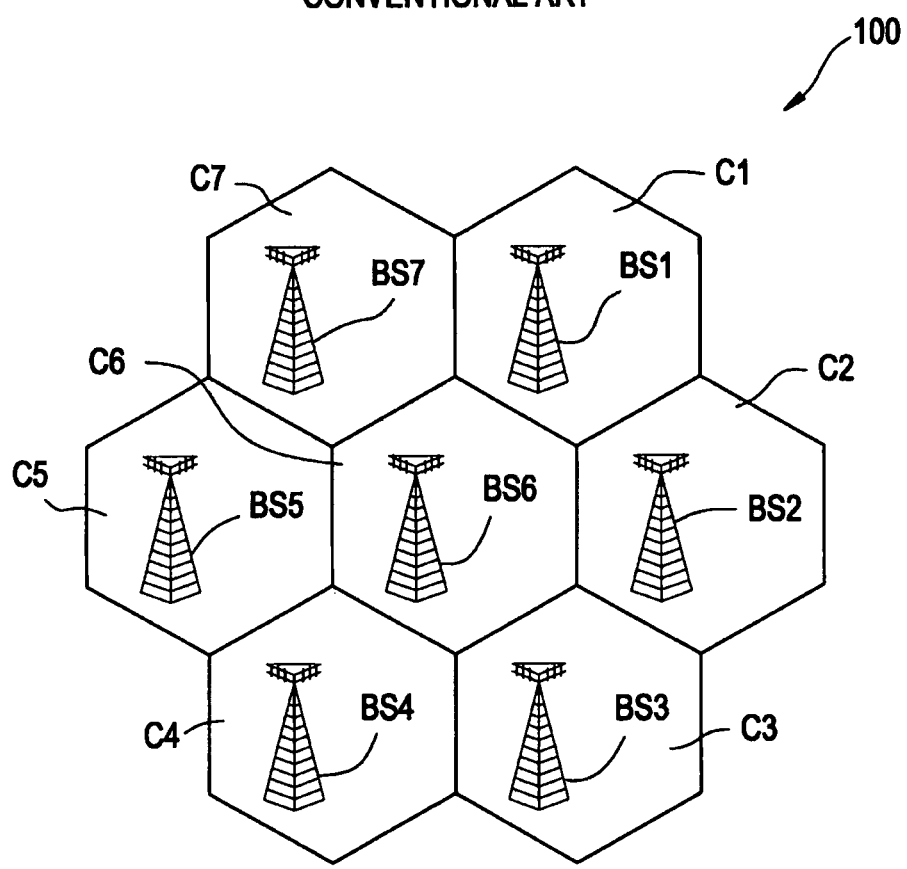
FIGS. 1-6 represent non-limiting, example embodiments as described herein.

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As used herein, the term "user equipment" (UE) may be synonymous to a mobile user, mobile station, mobile terminal, user, subscriber, wireless terminal and/or remote station and may describe a remote user of wireless resources in a wireless communication network.

The term "evolved NodeB" may be understood as a one or more cell sites, Node Bs, base stations, access points, and/or any terminus of radio frequency communication. Example embodiments described hereafter may generally be applicable to network architectures, such as LTE, ad hoc and/or mesh network architectures, for example.

Voronoi tessellations are well known in mathematics. A Voronoi tessellation includes a plurality of Voronoi regions. Each Voronoi, region includes a generating point. Each point within the Voronoi region is closer to the generating point for the Voronoi region than any other generating points for the other Voronoi regions. Segments (boundary lines) for the Voronoi region are all the points that are equidistant to the generating point for the Voronoi region and a generating point for another Voronoi region.

Example embodiments disclose determining a Voronoi region for each eNodeB (base station) within a communication system. The determined Voronoi region for each eNodeB is used by a controller of the communication system as the coverage area for the eNodeB. The eNodeB is the generating point for the Voronoi region. Since the coverage areas are based on associated Voronoi regions, all locations within a coverage area are closest to the eNodeB associated with the coverage area.

Figure 2:
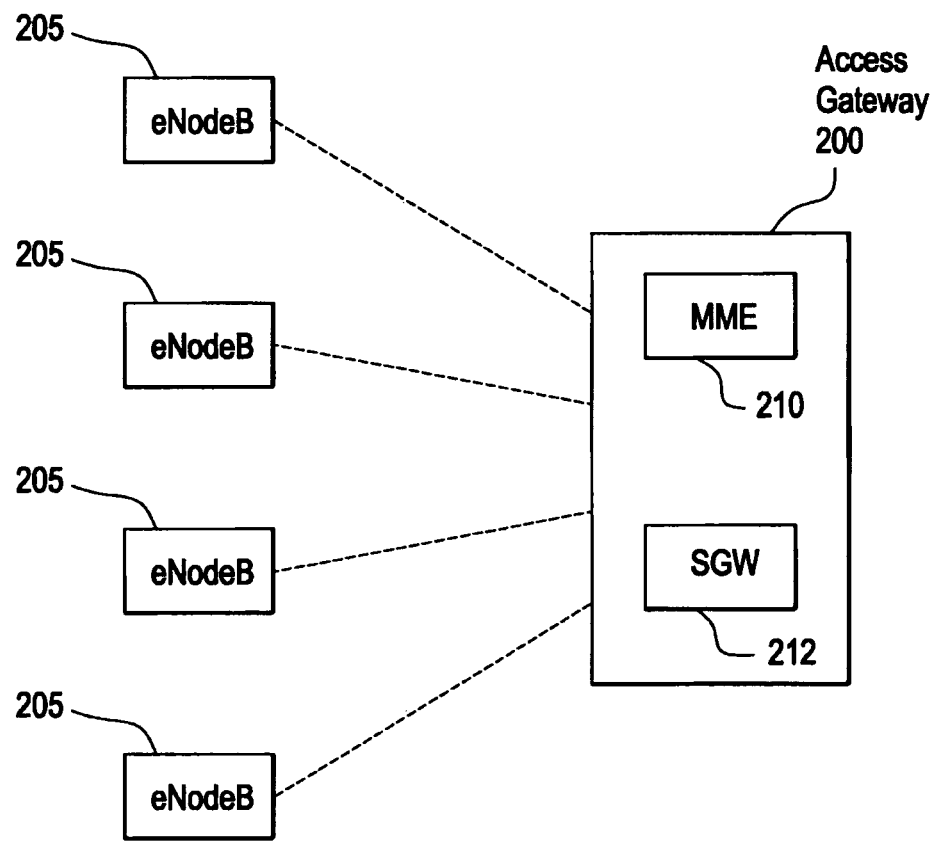

FIG. 2 shows a portion of an E-UTRAN deployment including a network management layer 200 in communication with a plurality of eNodeBs 205. As is well-known, multiple cells or a single cell are often associated with a single eNodeB.

The E-UTRAN network management layer 200 includes a Mobility Management Entity (MME) 210 and a serving gateway SGW 212. The MME 210 is a logical entity that controls the eNodeBs 205 and coordinates scheduling and transmission for eNodeBs 205. In more detail, functions of the MME 210 include scheduling and timing control, eNodeB registration and feedback. The MME 210 is in two-way communication with the eNodeBs 205. As described in 3GPP TS 36.300 V.8.6.0, the entire contents of which is incorporated herein by reference, the MME 210 controls, inter alia, user radio access network (RAN) mobility management procedures and user session management procedures.

For example, the MME 210 controls a UE's tracking and reachability. The MME 210 also controls and executes transmission and/or retransmission of signaling messages such as paging messages for notifying destination UEs of impending connection requests (e.g., when UEs are being called or when network initiated data intended for the UE is coming).

The SGW 212 is a data plane element. The SGW 212 is a mobility anchor during handoffs between eNodeBs 205 and an anchor for mobility between LTE and other 3GPP technologies.

While example embodiments are described with reference to a 4G/LTE network, example embodiments are contemplated as being applicable to any wireless communication infrastructure.

Figure 3:
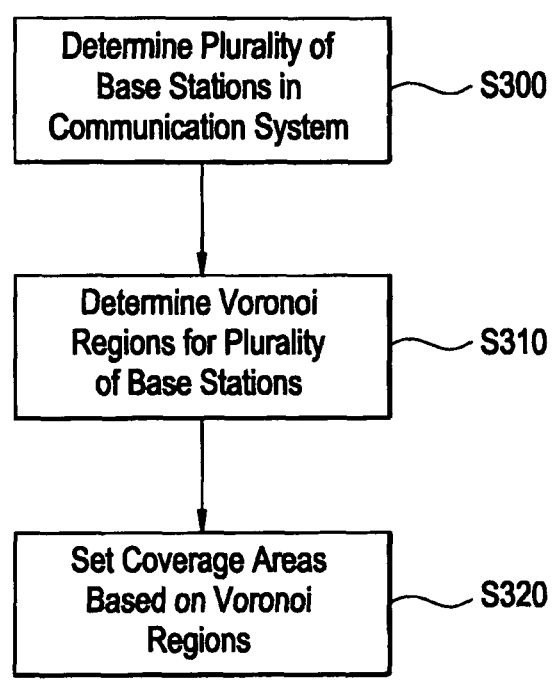

FIG. 3 illustrates a method of determining coverage areas in a communication system. The method of FIG. 3 may be performed by a controller in a network management layer such as the MME 210 in the network management layer 200. More specifically, a controller that implements the method of FIG. 3 determines a plurality of base stations in the communication system and determines a Voronoi region for each of the plurality of eNodeBs. The Voronoi region corresponds to the coverage area for the eNodeB.

At step S300, the controller determines a number of a plurality of eNodeBs (base stations) in the communication system. The controller may determine the number of eNodeBs by any known method. The controller may set a limit of the number of eNodeBs.

At step S310, the controller then determines a Voronoi region (cell footprint) for each of the plurality of eNodeBs. More specifically, the controller determines a Voronoi tessellation, including the Voronoi regions, for the cell sites in the communication system (e.g., a radio access network). The controller determines a Voronoi region by using an associated eNodeB as a generating point for the Voronoi region. Algorithms used to determine Voronoi tessellations are known in fields not related to communications. However, the controller may use any known algorithm used to determine the Voronoi tessellation and the Voronoi regions within the Voronoi tessellation.

For example, the controller may assume a flat-world view to determine the Voronoi regions. The controller may use Fortune's Algorithm to determine the Voronoi regions for the eNodeBs using the locations of the eNodeBs (e.g., x and y coordinates) in Fortune's Algorithm.

Once the controller determines the Voronoi tessellation, the controller sets the coverage areas for the eNodeBs based on the associated Voronoi regions, respectively, at step S320. The coverage area used for performance analysis for an eNodeB is the associated Voronoi region for the eNodeB. Since the coverage areas are based on the associated Voronoi regions, all locations within a coverage area are closest to the eNodeB associated with the coverage area.

The controller is configured to transmit a signal indicating an associated Voronoi region to each eNodeB. Moreover, each eNodeB sets initial parameter values based on the associated Voronoi region. For example, the controller may assume a flat-world view and determine the Voronoi regions based on the flat world-view. Using the Voronoi regions, the controller determines the initial parameter values. The initial parameter values are populated in each cell and refined based on UE measurements. The initial parameter values may include signal power, power offsets for traffic and control channels, antenna tilt angles, handoff parameters and reselection parameters.

As such, in performance analysis, the coverage area for an eNodeB is not a hexagon. By contrast, the coverage area according to example embodiments is a convex polygon (Voronoi region).

Because of the nature radio propagation (receive level decreases according to distance from transmitter), Voronoi regions provide many benefits over the conventional hexagonal model.

Two such examples are antenna tilt and transmit power. The transmit power of an eNodeB is associated with one of the vertices of the Voronoi region.

Figure 4:
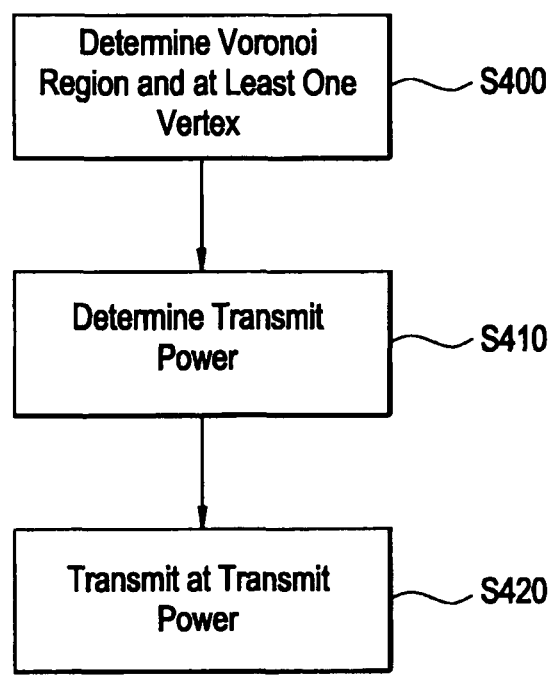
Figure 5:
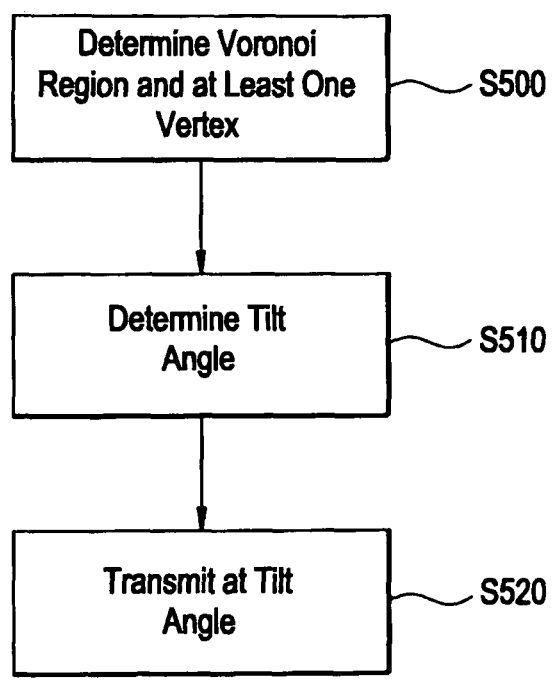
Figure 6:
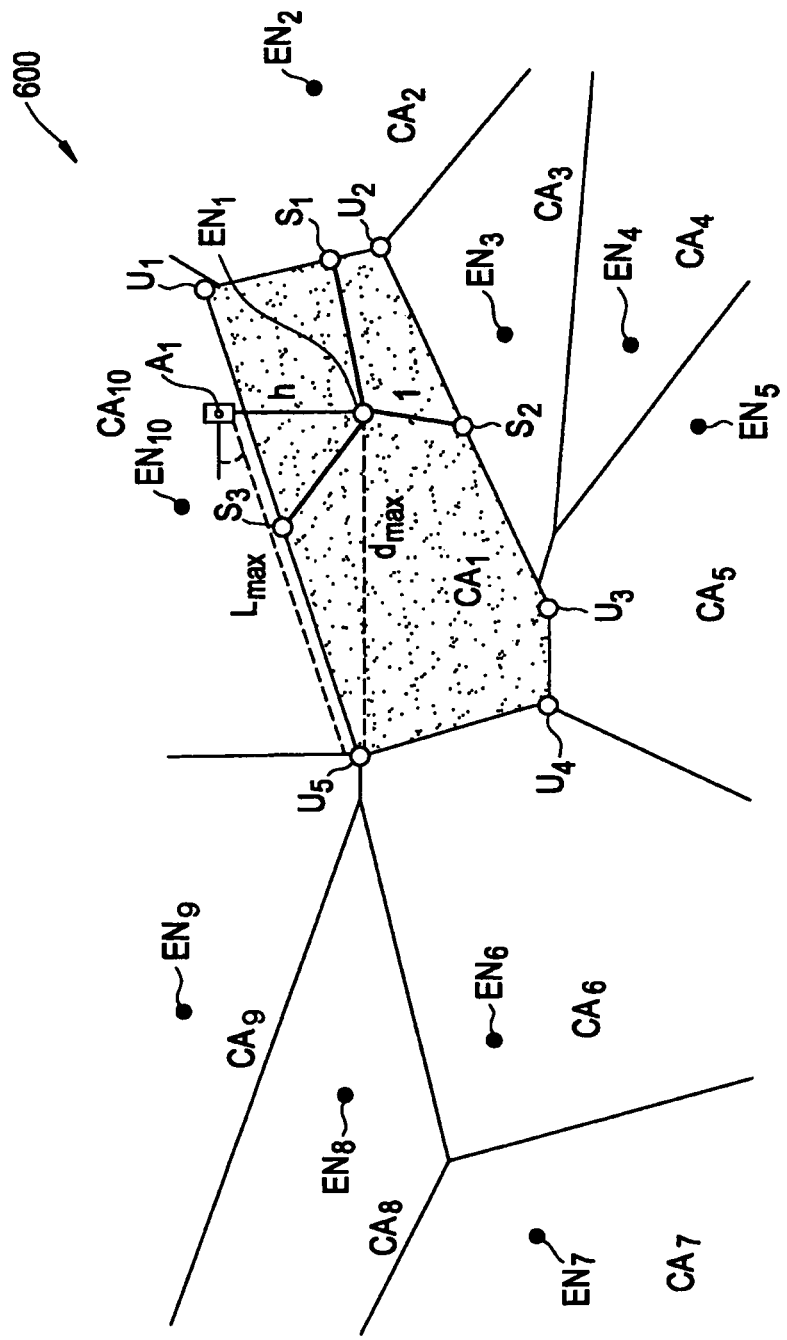

FIG. 4 illustrates a method of determining transmit power based on a Voronoi region. FIG. 5 illustrates a method of determining a tilt angle for an antenna on an eNodeB based on a Voronoi region. FIG. 6 illustrates a communication system having a plurality of eNodeBs and Voronoi regions as coverage areas. FIG. 6 is used to describe the methods illustrated in FIGS. 4 and 5. The methods illustrated in FIGS. 4 and 5 may be implemented by an eNodeB in a communication system such as the eNodeBs 205 shown in FIG. 2.

FIGS. 4 and 5 are implemented by an eNodeB in communication with a controller that is configured to determine Voronoi regions for coverage areas. The eNodeB includes at least one antenna.

At step S400, the eNodeB determines the associated Voronoi region for the eNodeB. More specifically, the eNodeB receives a signal indicating the Voronoi region from the controller. Using FIG. 2 as an example, the eNodeB receives a signal indicating the Voronoi region from the MME 210. The eNodeB also determines at least one vertex (e.g., a vertex farthest from the location of the eNodeB) of the associated Voronoi region. The at least one vertex may be a maximum distance $d_{max}$ within the associated Voronoi region from the eNodeB.

The eNodeB then determines a transmit power for the coverage area based on the maximum distance $d_{max}$, at step S410. The transmit power is determined by the eNodeB so that every UE within the coverage area (Voronoi region) may receive signals transmitted by the eNodeB. At step S420, the eNodeB transmits signals at the transmit power to UEs within the coverage area for the eNodeB.

As described, the eNodeB first determines at least one vertex of a Voronoi region. The Voronoi region corresponds to a coverage area for the eNodeB and the at least one vertex corresponds to a maximum transmitting distance. Consequently, the eNodeB receives the determined Voronoi region from the controller.

FIG. 5 illustrates a method of determining a tilt angle for an antenna based on a Voronoi region. Step S500 is the same as step S400. Therefore, a detailed description of step S500 is not provided, for the sake of brevity.

At step S510, the eNodeB determines a tilt angle for the antenna based on the maximum distance $d_{max}$ and a height of the antenna h. The determination of the tilt angle is described in more detail with reference to FIG. 6.

Once the eNodeB determines the tilt angle of the antenna, the eNodeB transmits signals at the tilt angle at step S520. While the eNodeB described includes one antenna, it should be understood that example embodiments may include eNodeBs having multiple antennas. For example, example embodiments may be implemented in a multiple input-multiple output (MIMO) system.

Each of FIGS. 3-5 may be performed by the controller and eNodeBs every time the controller detects that an eNodeB becomes inactive (e.g., shuts down) or is added to the communication system, for example. If an eNodeB goes down, the controller reconfigures the Voronoi regions for each active eNodeB. Therefore, the coverage areas for the active eNodeBs would compensate for the lost coverage area due to the eNodeB that is inactive.

FIG. 6 illustrates a communication system having a plurality of eNodeBs and Voronoi regions as coverage areas. As shown, a communication system 600 includes eNodeBs $EN_1$-$EN_{10}$. Each eNodeB $EN_1$-$EN_{10}$ is associated with a coverage area $CA_1$-$CA_{10}$. While not shown, it should be understood that the communication system 600 includes a controller like the MME 210. The controller determines the coverage areas $CA_1$-$CA_{10}$, as described in the method of FIG. 3.

For the sake of clarity and brevity, the eNodeB $EN_1$ and the coverage area $CA_1$ for the eNodeB $EN_1$ is described. However, it should be understood that the description of the eNodeB $EN_1$ is applicable to the eNodeBs $EN_2$-$EN_{10}$. Moreover, while the communication system 600 is illustrated as having ten eNodeBs, the communication system 600 may include more or less than ten eNodeBs and example embodiments should not be construed as being limited to ten eNodeBs.

As shown, the eNodeB $EN_1$ includes an antenna Ai configured to transmit and receive signals to/from UEs in the coverage area $CA_1$ and to/from the controller. The antenna Ai is located at a height h above ground.

Based on a signal received from the controller, the eNodeB $EN_1$ determines the vertices of its associated Voronoi region (step S400/S500), the coverage area $CA_1$. The Voronoi region for the coverage area $CA_1$ includes vertices $V_1$-$V_5$. As shown, the vertex $V_5$ is the maximum distance $d_{max}$ from the eNodeB $EN_1$. Since the transmit power that is determined by eNodeB $EN_1$ is based on the maximum distance $d_{max}$ from the eNodeB $EN_1$ to an edge of the coverage area $CA_1$, each UE within the coverage $CA_1$ receives signals transmitted by the eNodeB $EN_1$ at the transmit power.

The eNodeB $EN_1$ determines the transmit power using the following equation:

$$P_1 = T_0 d_{max}^\alpha \qquad (1)$$

wherein $P_1$ is a power receive level at a point at the distance $d_{max}$ from the eNodeB $EN_1$. A transmit power for the eNodeB $EN_1$ is $T_0$ and $\alpha$ is an attenuation constant based on the frequency band of operation.

The coverage area $CA_1$ also includes points $S_1$-$S_3$ that are determined by the eNodeB $EN_1$ based on a sector configuration for the ENodeB $EN_1$.

Moreover, the eNodeB $EN_1$ determines the antenna tilt as follows:

$$\text{Tilt} = \tan^{-1}(h/d_{max}) \quad (2)$$

Once a UE communicates with the eNodeB $EN_1$, actual UE measurements may provide a more accurate estimate of the maximum path loss than the maximum path loss based on the attenuation constant $\alpha$. The difference between maximum path loss based on the attenuation constant $\alpha$ and the maximum path loss based on the UE measurements is used by the eNodeB $EN_1$ to update transmit-power compensation powers, as well as load-balancing power estimates.

Example embodiments are described with each base station/eNodeB covering an Omni cell, for the sake of convenience. However, example embodiments may be extended to any number of sectors/cell.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of determining coverage areas in a communication system, the method comprising:
    first determining, by a controller, a plurality of base stations in the communication system, the controller being configured to communicate with the plurality of base stations and coordinate scheduling and transmission for the plurality of base stations; and
    second determining, by the controller, a Voronoi region for each of the plurality of base stations, the Voronoi region corresponding to the coverage area for the base station and each location in the Voronoi region is closest to the base station than any other base station of the plurality of base stations.

2. The method of claim 1, wherein the first and second determining are performed if the controller detects another base station in the communication system or if the controller cannot not communicate with one of the plurality of base stations.

3. The method of claim 1, wherein the second determining determines the Voronoi region based on the base station being a generating point of the Voronoi region.

4. The method of claim 1, wherein the second determining determines the Voronoi region for each of the plurality of base stations, the Voronoi regions not overlapping.

5. A method of analyzing performance of a communication system, the method comprising:
    determining, by a first base station including at least one antenna, at least one vertex of a Voronoi region, the Voronoi region corresponding to a coverage area for the base station, each location in the Voronoi region is closest to the base station than any other base stations, and the at least one vertex corresponding to a maximum transmitting distance.

6. The method of claim 5, further comprising:
    second determining, by the first base station, a transmit power based on the at least one vertex of the Voronoi region.

7. The method of claim 6, further comprising:
    transmitting, by the first base station, a pilot signal at the transmit power.

8. The method of claim 6, wherein the second determining determines the transmit power further based on a path loss threshold.

9. The method of claim 6, further comprising:
    third determining, by the first base station, a tilt angle for the at least one antenna based on the at least one vertex of the Voronoi region.

10. The method of claim 9, further comprising:
    transmitting, by the first base station, a pilot signal at the tilt angle.

11. The method of claim 5, further comprising:
    second determining, by the first base station, a tilt angle for the at least one antenna based on the at least one vertex of the Voronoi region.

12. The method of claim 11, further comprising:
    transmitting, by the first base station, a pilot signal at the tilt angle.

* * * * *